United States Patent

Cherng et al.

[11] Patent Number: 5,469,043
[45] Date of Patent: Nov. 21, 1995

[54] METHOD FOR OPTIMIZING THE CHARGING OF LEAD-ACID BATTERIES AND AN INTERACTIVE CHARGER

[75] Inventors: Jing-Yih Cherng, Eagan; James K. Klang, Rosemount, both of Minn.

[73] Assignee: GNB Battery Technologies Inc., Mendota Heights, Minn.

[21] Appl. No.: 272,997

[22] Filed: Jul. 14, 1994

Related U.S. Application Data

[63] Continuation of Ser. No. 960,583, Oct. 13, 1992, abandoned.

[51] Int. Cl.$^6$ ................................................ H01M 10/44
[52] U.S. Cl. ................................................ 320/31
[58] Field of Search ................................ 320/20, 21, 31, 320/39, 37

[56] References Cited

U.S. PATENT DOCUMENTS

| | | | |
|---|---|---|---|
| 3,421,067 | 1/1969 | Wilson et al. | 320/14 |
| 3,424,969 | 1/1969 | Barry | 320/21 |
| 3,517,293 | 6/1970 | Burkett et al. | 320/14 |
| 3,517,295 | 6/1970 | Lapuyade | 320/32 |
| 3,609,503 | 9/1971 | Burkett et al. | 320/5 |
| 3,758,839 | 9/1973 | Medlar | 320/32 |
| 3,816,806 | 6/1974 | Mas | 320/20 |
| 3,816,807 | 6/1974 | Taylor | 320/20 |
| 4,131,841 | 12/1978 | Bennefeld | 320/23 |
| 4,191,916 | 3/1980 | Zasio et al. | 318/640 |
| 4,220,905 | 9/1980 | Quarton | 320/39 |
| 4,396,880 | 8/1983 | Windebank | 320/21 |
| 4,629,965 | 12/1986 | Fallon et al. | 320/39 |
| 4,668,901 | 5/1987 | Furukawa | 320/31 |
| 4,740,739 | 4/1988 | Quammen et al. | 320/14 |
| 4,742,290 | 5/1988 | Sutphin et al. | 320/21 |
| 4,829,225 | 5/1989 | Podrazhansky et al. | 320/14 |
| 4,956,597 | 9/1990 | Heavey et al. | 320/14 |
| 5,049,803 | 9/1991 | Palanisamy | 320/20 |
| 5,049,804 | 9/1991 | Hutchings | 320/20 |

*Primary Examiner*—Peter S. Wong
*Assistant Examiner*—Edward Tso
*Attorney, Agent, or Firm*—Leydig, Voit & Mayer, Ltd.

[57] ABSTRACT

A method and apparatus is disclosed for charging lead-acid batteries which comprises periodic voltage sweeps to determine the charging voltage that should be used for the battery and then adjusting the charging voltage in accordance with that voltage sweep information so as to ensure that a highly efficient charging process is achieved which avoids undue gassing and inherently compensates for factors such as the temperature, type and service life history of the battery and resistance due to the interactive nature of the technique and apparatus. One suitable technique for analysis and adjustment of the voltage sweep data involves analyzing the slope of the current versus the voltage sweep curve so as to determine certain slope values or changes in values.

9 Claims, 17 Drawing Sheets ial charge carried out at
METHOD FOR OPTIMIZING THE CHARGING OF LEAD-ACID BATTERIES AND AN INTERACTIVE CHARGER This is a continuation of application Ser. No. 07/960,583 filed on Oct. 13, 1992 now abandoned.

FIELD OF THE INVENTION

This invention relates to lead-acid batteries and, more particularly, to a method and apparatus which may be utilized in charging such batteries.

BACKGROUND OF THE INVENTION

Lead-acid batteries have been used for many diverse applications. Such applications include use as a starting, lighting and ignition power source for vehicles (SLI), use in marine batteries for starting, lighting and other auxiliary power requirements, as a motive power source for use in golf carts and other vehicles and other applications of this sort. In addition, lead-acid batteries have been employed in a variety of stand-by power applications to provide a power source when the main power source becomes inoperable, as by, for example, interruption of electricity. Lead-acid batteries have also been employed in many other applications, e.g., uniform power distribution, power damping applications, and even for small electronic devices such as video cameras and cassette players.

While the extent of discharge and the particular cycling requirements of a lead-acid battery for a specific application vary widely, one criterion remains constant: it is important to ensure that proper charging of such batteries is carried out. Thus, on the one hand, undercharging such lead-acid batteries can result in less than optimum output and service life. Undercharging can result in perhaps permanent sulfation of part of the active materials, as well as stratification of the electrolyte and uneven use of the active materials.

On the other hand, undue overcharging of lead-acid batteries likewise creates problems. Overcharging of lead-acid batteries thus can result in permanent damage of the batteries as well as presenting potential safety hazards caused by, for example, boiling the electrolyte of the battery. Further, overcharging lead-acid batteries can accelerate positive grid corrosion and even lead to bulging and/or buckling of the battery plates. Among other undesirable aspects of undue overcharging are the undesirable increase in the specific gravity of the electrolyte, possible oxidation of the separators and the undue heat generated that can accelerate various problems.

The time and manner in which lead-acid batteries are charged is also important for other reasons. Thus, many applications require charging within a relatively short period of time so that it is important to optimize the current or voltage used, while, at the same time, avoiding the use of excessively high currents that will result in gassing and the like.

Further, the design of a suitable charger for lead-acid batteries that will allow optimization of the charging procedure is extremely complex. Typically, the state-of-charge (or state-of-discharge) of the battery requiring charging is not known. Also unknown are such factors as the specific use history of the particular battery, as well as the age and maintenance history, all of which can affect the optimum charging requirements. Similarly, the internal temperature of the battery is either unknown, or, if known, the ability to compensate for the particular internal temperature in the charging process is quite difficult.

Another important factor complicating battery charger design is the type of battery being charged. Commercially used lead-acid batteries thus represent a broad spectrum of widely varying designs, ranging from flooded-type batteries (both maintenance-free and batteries requiring maintenance during service life) to valve-regulated recombinant sealed lead-acid batteries (where essentially all of the electrolyte is retained in the plates and separators and charging gas is recombined to water within the battery).

The size of the battery or cell being charged must also be taken into account. The requirements for charging a 12-volt battery are different from those requirements for a 6-volt battery or for a single lead-acid cell.

Additional factors that must be taken into account in determining the charging regime include the rate at which the battery was discharged and the stand time since discharge. The composition of the battery grids will affect the charging regime as will the presence of electrochemical impurities.

Another important factor that must be considered is the safety aspects of a battery charger. There is the potentiality for fumes, fire, explosion or thermal runaway when a battery such as an internally shorted battery or a sealed valve regulated recombinant battery is over-charged with typical fixed voltage chargers.

Still further, a stand-alone battery charger configuration may allow design considerations that could not be tolerated in a vehicle charging apparatus. Thus, in a vehicle, the dynamics of the battery utilization must be considered, viz., the charging regime may be taking place alternatively while the battery could be called on to deliver power due to a myriad of conditions.

For these and other reasons, it is not surprising that there has been considerable effort over a period of many years to provide battery chargers suitable for lead-acid batteries that overcome one or more of the problems involved. Thus, U.S. Pat. No. 3,421,067 to Wilson et al. discloses a battery charger control circuit which includes a coulometer to accurately measure the state-of-charge of the battery. That coulometer measurement is then used to cause the battery to be charged at the maximum available current rate until a charge exactly equal to the previous discharge has been accomplished.

U.S. Pat. No. 3,424,969 to Barry shows a battery charge control which includes sensing the rate of rise of voltage of the battery while fast-charging the battery. This fast-charging is terminated upon sensing a rate of rise that exceeds a predetermined rate.

U.S. Pat. No. 3,517,293 to Burkett et al. discloses charging a battery by imposing an increasing charge on the battery by charging during certain intervals and by providing discharge intervals interspersed with the charge intervals.

U.S. Pat. No. 3,816,806 to Mas involves discharging the battery periodically during the charging process.

U.S. Pat. No. 3,816,807 to Taylor notes that, in attempts to overcome the effects of temperature and age, efforts have turned to using the gas evolution rate as a more direct indication of the charge acceptance. It is stated that such systems appear to be unstable and have battery aging problems. Taylor discloses a charging sequence using the battery impedance as a charge control parameter.

U.S. Pat. No. 4,629,965 to Fallon et al. shows a charger for a battery which includes an initial charge carried out at a maximum rate of current which tapers in magnitude until the battery attains a certain voltage. Thereafter, the battery is charged with a continuous reduction of current until termination.

U.S. Pat. No. 4,742,920 to Sutphin et al. discloses a microprocessor-directed battery charger which utilizes a dV/dt sensing. A timed finishing charge is used to enable a quicker and more efficient charging.

U.S. Pat. No. 4,829,225 to Podrazhansky et al. discloses a method and a device for rapidly charging a battery by providing a charge pulse to the battery, followed immediately by a depolarization pulse created by allowing the battery to discharge across a load and followed by a stabilization period. The sequence is cyclically repeated until the battery is charged.

U.S. Pat. No. 4,956,597 to Heavey et al. discloses a battery control circuit that first monitors the battery charge during a charge cycle until the charge voltage approaches the voltage range where the gassing point of the battery is anticipated to occur. As the charging voltage reaches the first voltage threshold level, a pulsed loading circuit is activated which periodically places a load across the battery and accurately measures the true output voltage. When the measured pulsed load voltage exceeds the threshold voltage predetermined to be indicative of the entry of the battery into the gassing phase, a timing network is activated and charging is continued for only a predetermined time.

U.S. Pat. No. 5,049,804 to Hutchings discloses what is considered to be a universal battery charger. This charger includes a microprocessor which receives inputs from current, voltage and temperature sensors for controlling the battery-charging profile.

It has further been proposed to use a microprocessor-based device to test the status of a battery using the battery starting characteristics. The battery status monitor determines the battery characteristics from two sets of data. One set of data is collected during normal usage of the battery, while the second set of data is taken during a specialized test profile typically in conditions like highway driving.

The test cycle involves imposing linearly increasing current or voltage ramp onto the battery terminals and then measuring the corresponding voltage or current response of the battery. The presence of a maximum in the dV/DI versus $I_{ramp}$ or a minimum in the dI/dV versus the $V_{ramp}$ indicates the gas point.

It was also found that the current at which the gas point occurs in the ramp-up direction is proportional to the battery capacity. The current at which the gas point occurs in the ramp-down direction reaches the lowest possible value when the battery is fully charged. Thus, the battery capacity can be determined from the former, and the state-of-charge from the latter parameter.

Despite all of the considerable effort evident in this field, there still exists the need for a method and apparatus that allows lead-acid batteries to be efficiently recharged. It is accordingly an object of the present invention to provide a method and apparatus for charging a lead-acid battery which is interactive with the battery being charged so the charging will inherently take into account, and compensate for, such factors as the service life history of the specific battery being charged so as to allow the charging profile to be capable of being optimized for that specific battery.

Another object of this invention is to provide a method and apparatus for recognizing the optimized charging current and voltage to achieve charging at a very high efficiency, while minimizing the amount of gassing.

A further object lies in the provision of a battery charger which inherently compensates for the internal temperature of the battery.

Yet another and more specific object of the present invention is to provide a method and apparatus for recognizing the state-of-charge of the battery so as to allow control of the end charge of the battery.

A still further object provides a method and apparatus for compensating for battery flaws such as imbalance from one cell to another as well as internal shorts and the like.

An additional object is to provide a battery charger that is capable of efficiently charging any size of cell or battery.

Other objects and advantages of the present invention will become apparent as the following description proceeds.

SUMMARY OF THE INVENTION

The present invention is predicated on the discovery that the use of periodic voltage sweeps to generate current-voltage information can be effectively utilized to provide a battery charger that is truly interactive, as the charging of the battery is varied based upon the voltage sweep information derived from the battery itself. The present invention thus inherently takes into account the internal temperature of the battery, internal battery resistance, charging circuit resistance and other service life and history factors that can alter the charging requirements.

To this end, utilizing such voltage sweeps detects the charge acceptance of the battery being charged as well as the gassing regions. Based upon the information detected, an optimum charging voltage can be employed, inherently providing the optimum IR, temperature and cell voltage compensation.

The voltage sweeps utilized involve increasing the applied voltage across the batteries to generate current-voltage information over the period of time involved in carrying out the sweep. Such voltage sweeps are then periodically repeated so as to determine if the optimum charging voltage has changed. In this fashion, the charging of the lead-acid batteries can be optimized by avoiding use of a voltage level that would either result in unduly overcharging the battery during the charging sequence or, on the other hand, would provide undercharging.

It is also possible to utilize the voltage information generated as an indication of when the charging cycle should be terminated. Thus, when charging has been completed, the appropriate voltages remain constant over time; and this condition can be utilized to dictate termination of the charging cycle.

The versatility of the present invention is such that the charging cycle is suitably altered as is required by the type of battery being charged, as well as providing a charging regime that will accommodate conditions such as a partial shorting of the battery, or the like.

While the present invention is susceptible of various modifications and alternative forms, the specific embodiments thereof will hereinafter be described in detail. It should be understood, however, that it is not intended to limit the invention to the particular forms disclosed, but, on the contrary, the invention is to cover all modifications, equivalents and alternatives falling within the scope of the invention as expressed in the appended claims. Thus, the method and apparatus of the present invention are described herein in connection with the charging of lead-acid batteries and cells. However, while the present invention does indeed provide substantial advantages in charging lead-acid batteries, it should be appreciated that the present invention can likewise be advantageously used for charging other electrochemical systems that possess similar electrochemical characteristics, i.e., voltage sweep information which allows selection of the optimum charging voltage based upon the sweep charge limiting current as described herein. As illustrative examples, it is contemplated that the present invention can advantageously be used with nickel-cadmium, nickel-iron and nickel-zinc systems. Further, while the voltage sweeps described herein generally involve increasing the voltage to generate the current-voltage information, it should be appreciated that it is within the scope of the present invention to carry out the voltage sweeps by starting out at an appropriately high voltage and then decreasing the voltage to generate the necessary current-voltage information.

DETAILED DESCRIPTION OF THE INVENTION

Figure 1:
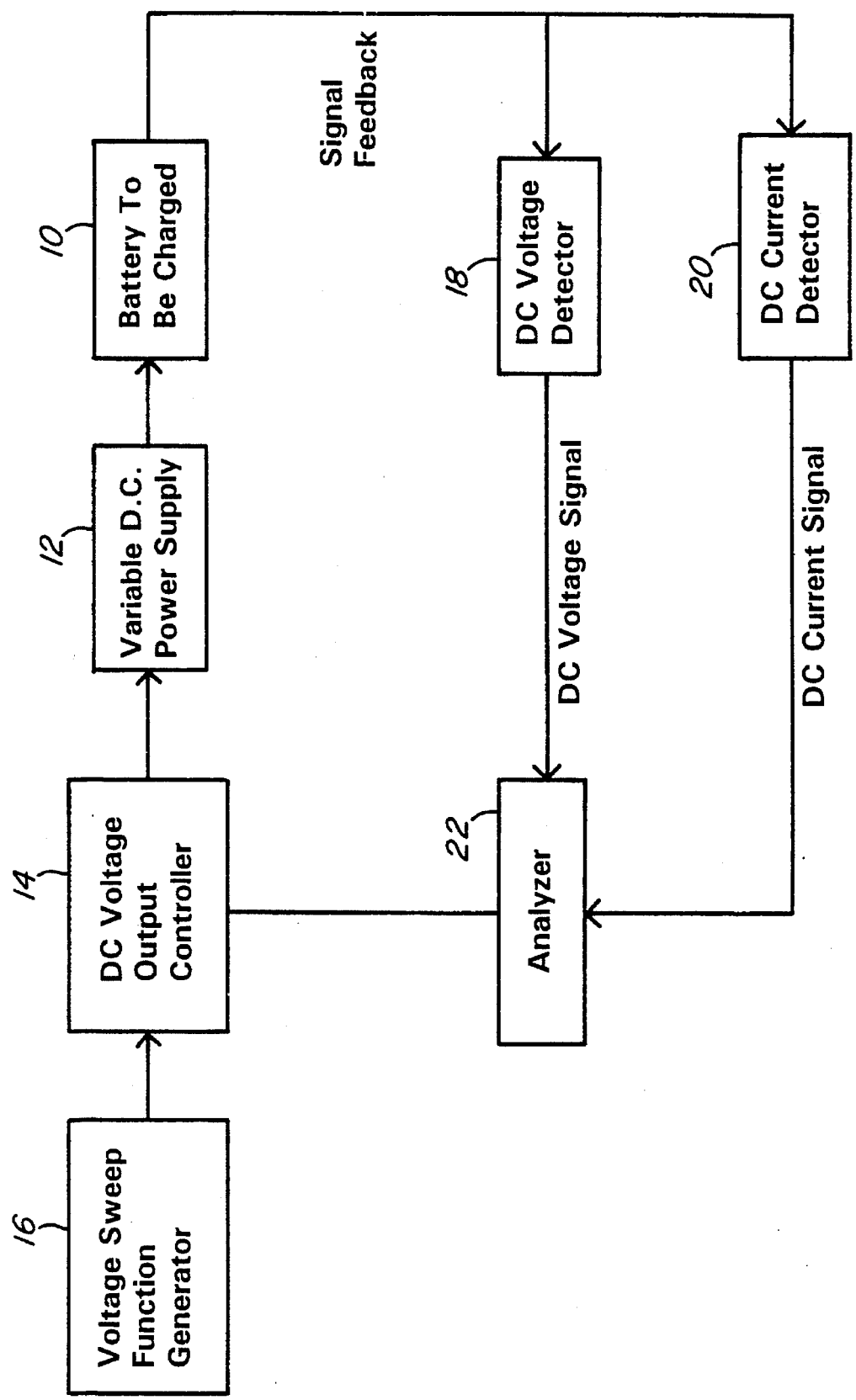
FIG. 1 is a block diagram illustrating an exemplary lead-battery charger according to the present invention which utilizes voltage sweeping to alter the charging regime.

Turning now to FIG. 1, there is shown an apparatus in accordance with the present invention for charging lead-acid batteries. As is schematically illustrated, the battery to be charged is shown at 10.

A variable DC power supply 12 is provided to charge the battery 10. Any of the power supplies used for charging lead-acid batteries can be employed so long as such power supplies can provide a variable voltage (and thus current) to the battery over the usual range of voltages, i.e., up to 17 volts or more. As one illustration, a variable DC power supply that can be used comprises an AC transformer, rectifier and filtering capacitors with current and voltage regulators. The power supply employed should, of course, provide a sufficiently stable voltage and current so as to allow appropriately accurate voltage sweep information to be developed as described herein.

A DC voltage output controller 14 serves to adjust the voltage, and, thus, the current the power supply 12 provides. Suitable microprocessors and electronic controls for serving as output controllers are well known.

In accordance with the present invention, voltage sweep function generator means are provided which are capable in the broadest aspects of this invention of causing the voltage applied by the power supply to sweep through a range that has been predetermined so as to allow, as will be more particularly discussed hereinafter, an analysis of the current versus voltage information over the predetermined range. A voltage sweep function generator 16 thus serves to periodically cause the DC voltage output controller 14 to interrupt the charging sequence and to sweep the voltage through the predetermined range so that the sweep curve can be evaluated to determine if any adjustment is needed to optimize the charging voltage. Devices capable of serving as the voltage sweep function generator are known and include, as for example, RC circuits with analog integrated circuitry (e.g., voltage scan generator, Wenking Model USG72 by Brinkmann Co.).

The frequency at which the voltage sweep is carried out can be varied as desired. In general, it will be more desirable to more frequently carry out voltage sweeps in the early stages of charging. As may be appreciated, once the state-of-charge of the battery approaches 90% or so of full charge, then the time required to increase to about 100% state-of-charge becomes longer. As an illustrative example, the frequency of the voltage sweeps can vary from one sweep every 30 seconds to one sweep every two minutes. Of course, the frequency employed in a particular situation can be varied as desired.

Regarding the rate of sweep, the size of the power supply in relation to the battery being charged should be kept in mind. Also, the rate should not be so fast as to prevent accurate current-voltage information from being satisfactorily determined. Further, in a dynamic environment, such as in a vehicle, it will, of course, be generally preferred to carry out the sweep as quickly as is consistent with obtaining accurate data. As illustrative examples, it has been found suitable to carry out the sweep at a rate of from about 0.05 volt/second up to about 2 volts/second or so for a 12-volt lead-acid battery.

To simplify data generation and particularly analysis, it will be generally preferred to carry out the voltage sweep at a constant rate. This allows data analysis using either time or voltage, as these two parameters are synonymous for analysis purposes with a constant sweep rate. Of course, if desired for some reason, the sweep could be carried out at other than a constant rate. Further, the current-voltage information can be generated by increasing the voltage in incremental fashion, rather than continuously increasing the voltage. Accordingly, as used herein, the term "sweep" is intended to include both continuously and incrementally changing the voltage.

The predetermined range over which the voltage sweep is carried out can be varied as desired to fit the requirements for the particular application. Functionally, as a minimum, the predetermined range for the voltage sweep need only cover the voltage range that allows the optimum charging voltage to be determined. In many applications, the optimum charging voltage will be the maximum voltage that can be applied to the specific battery at the particular stage in the charging sequence without undue gassing. However, as may be appreciated, one aspect of the present invention is that the current-voltage information generated from the periodic voltage sweeps can be utilized to accomplish whatever objectives are desired. Thus, for example, when the desired charging has been completed, the current-voltage information can be employed to select an applied voltage that will accomplish an acid mixing step.

Of course, the voltage sweep range can be much longer than the functional minimum range discussed, if desired. It has been found convenient to utilize a range that starts at or near the open circuit voltage of the battery being charged and terminates at an applied voltage just above that value which provides the desired optimum charging voltage.

Pursuant to another aspect of the present invention, voltage and current detection means are provided. Thus, as shown, the voltage applied to battery 10 is determined by DC voltage detector 18 while the current is detected by a DC current detector 20. Any of a variety of suitable DC voltage and current detectors are known and may be used. As illustrative examples, analog-to-digital converters connected to microprocessors or voltage comparator circuits may be used.

The present invention further involves analyzing the current versus voltage sweep curves so as to vary the charging voltage as is required to optimize the charging sequence. As is illustrated, an analyzer 22 functions to generate and analyze the current-voltage sweep data so that the voltage applied by variable DC power supply 12 can be adjusted if necessary.

Figure 2A:
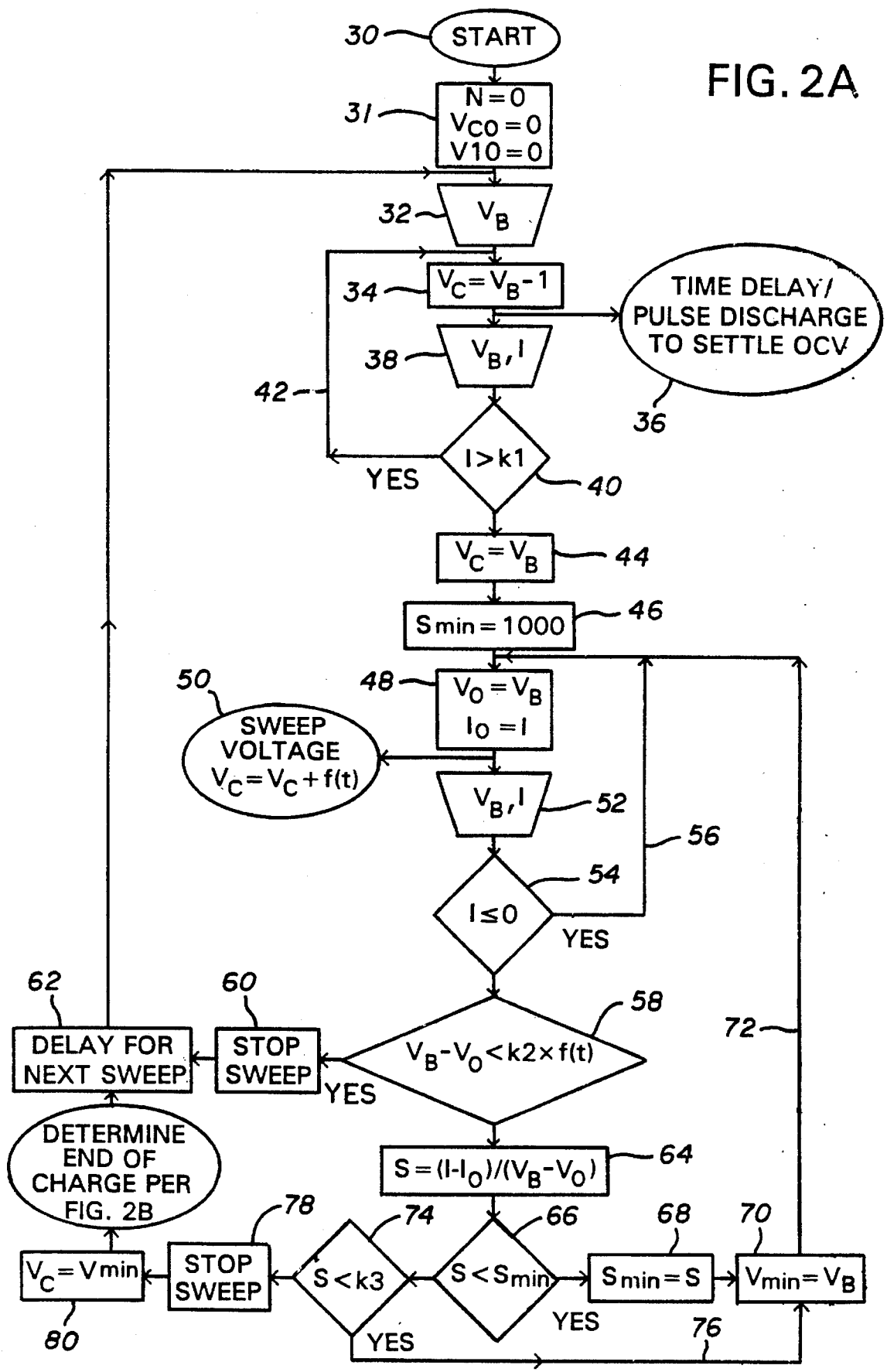
FIGS. 2A and B comprise a logic diagram showing one embodiment of how the voltage sweep information can be detected so as to allow utilization in controlling the battery charging regime.

The analysis and adjustment of the voltage sweep data can be carried out by any of a variety of techniques. It has thus been found suitable, as one example, to analyze the slope of the current versus voltage sweep curve so as to determine certain slope values or changes in values. The logic diagram for carrying out such a dI/dV determination is shown in FIGS. 2A and B. Certain aspects of the logic diagram concern a more preferred aspect of this invention (viz., detecting the end-of-charge condition of the battery being charged) and will be discussed later.

As shown in FIG. 2A, the start of the voltage sweep, shown at 30, involves measuring the battery voltage designated as $V_B$ at 32, and the voltage of the charger, $V_C$, is set at a lower voltage than $V_B$ as indicated at 34. The amount the charger voltage is decreased (e.g., one volt as shown in FIG. 2A) is arbitrary. In effect, the voltage decrease can be viewed as turning off the charger.

The battery voltage is then reduced by whatever means desired, as, for example, by providing a settling time and/or a small discharge pulse through a resistor as shown at 36. It has thus been found necessary to provide a voltage reduction adequate to insure that the battery voltage, $V_B$, will be below the optimum charging voltage and that the optimum charging voltage will be detected during the sweep. Further, while it will be desired to decrease the voltage of the battery to the level desired as promptly as possible where the charger is to be used in a vehicle as opposed to a stand-alone charger, the voltage settling time varies with state-of-charge, temperature and other factors.

After $V_C$ and $V_B$ have been decreased, as at 34 and 36, the current value, I and the battery voltage $V_B$ are measured as shown at 38. If current, I, is greater than an arbitrary value k1 as determined at 40, the logic loops back to decrease the voltage of the charger $V_C$ as shown at 42 until a current is registered that satisfies the condition at 40. The arbitrary value, k1, can appropriately be set at whatever value is desired. Generally, k1 will be zero or a minimal current when compared to the charging current provided by the applied voltage.

Once a beginning voltage or minimal current is obtained (viz., the criteria at 40 is satisfied), the charger voltage, $V_C$, is set to this beginning voltage, $V_B$, as shown at 44, and a value of the slope of the current-voltage sweep is assigned. In the illustrative embodiment, the minimum slope, $S_{min}$, indicated at 46, is set at an extremely high number so that the first slope determined is less than the initial $S_{min}$. As an example, it is suitable to set $S_{min}$ as 1,000 Amps/volt. Previously measured values of current and voltage at this time (i.e., $V_B$ and I are retained as $V_0$ and $I_0$) are saved as shown at 48.

The voltage augmentation is then initiated, increasing the voltage of the charger as a function of time as shown at 50. As an example, the charger voltage, $V_C$, can be increased at a selected constant rate with time (e.g., where the rate constant is 0.05 to 2 volts/second for a 12-volt lead-acid battery).

New values for the battery current and voltage are then determined as the voltage sweep continues as shown at 52. If the value of the current is less than, or equal to, zero, as shown at 54, the procedure loops back as shown at 56 until a positive current is registered.

Next, as shown at 58, it is determined whether the difference in the battery voltage is substantially less than the rate at which the charger voltage has been augmented. The purpose of this determination is to ascertain whether the battery charger has reached its maximum current where little further change in battery voltage will occur even though the applied voltage continues to increase. If the maximum current has been reached, the charger voltage can remain at that point and charging continued. At this point, the voltage sweep would be terminated as shown at 60, and a delay would occur, as at 62, until the next sweep is initiated.

If the power supply has not been fully loaded (i.e., maximum current has not been reached), a slope value is determined. This is indicated by the formula in the box indicated as 64. The slope is indicated as the quantity of change in the current divided by the change in the voltage. The value of the slope is then compared to $S_{min}$ as shown at 66. If S is less than $S_{min}$, $S_{min}$ is reset to the value determined as indicated at 68, viz., $S_{min}$ becomes the value determined and will be a value less than 1000 Amps/volt. The minimum voltage, $V_{min}$, is also set to the present battery voltage, $V_B$ as indicated at 70. Thereafter, the procedure involves looping back as shown at 72 and repeating the measuring of a new current and voltage value. This procedure is repeated down through determination of a slope minimum, $S_{min}$, and voltage minimum, $V_{min}$, as many times as is required, until the value of slope S is greater than the prior $S_{min}$ with which it is being compared.

At this point, the slope, S, is checked to determine its relationship to a preselected value, k3, as indicated at 74. If slope S is less than k3, the procedure loops back as shown at 76 and 72 with $V_{min}$ being reset to the present voltage of the battery, $V_B$, as indicated at 70. The procedure is repeated until slope S is greater than k3. At that point, the voltage sweep is stopped as indicated at 78, the battery charging voltage, $V_C$, is set at $V_{min}$ as shown at 80 or at some value less than $V_{min}$, if desired. Unless the end-of-charge feature is being utilized, a predetermined delay occurs as indicated at 62.

The procedure is thereafter repeated until the charging of the battery is completed. The logic for detecting the end-of-charge condition using the voltage information will be described later. The delay time between voltage sweeps may, of course, be altered as the battery comes closer to a full state-of-charge, as has been previously discussed.

Figure 3:
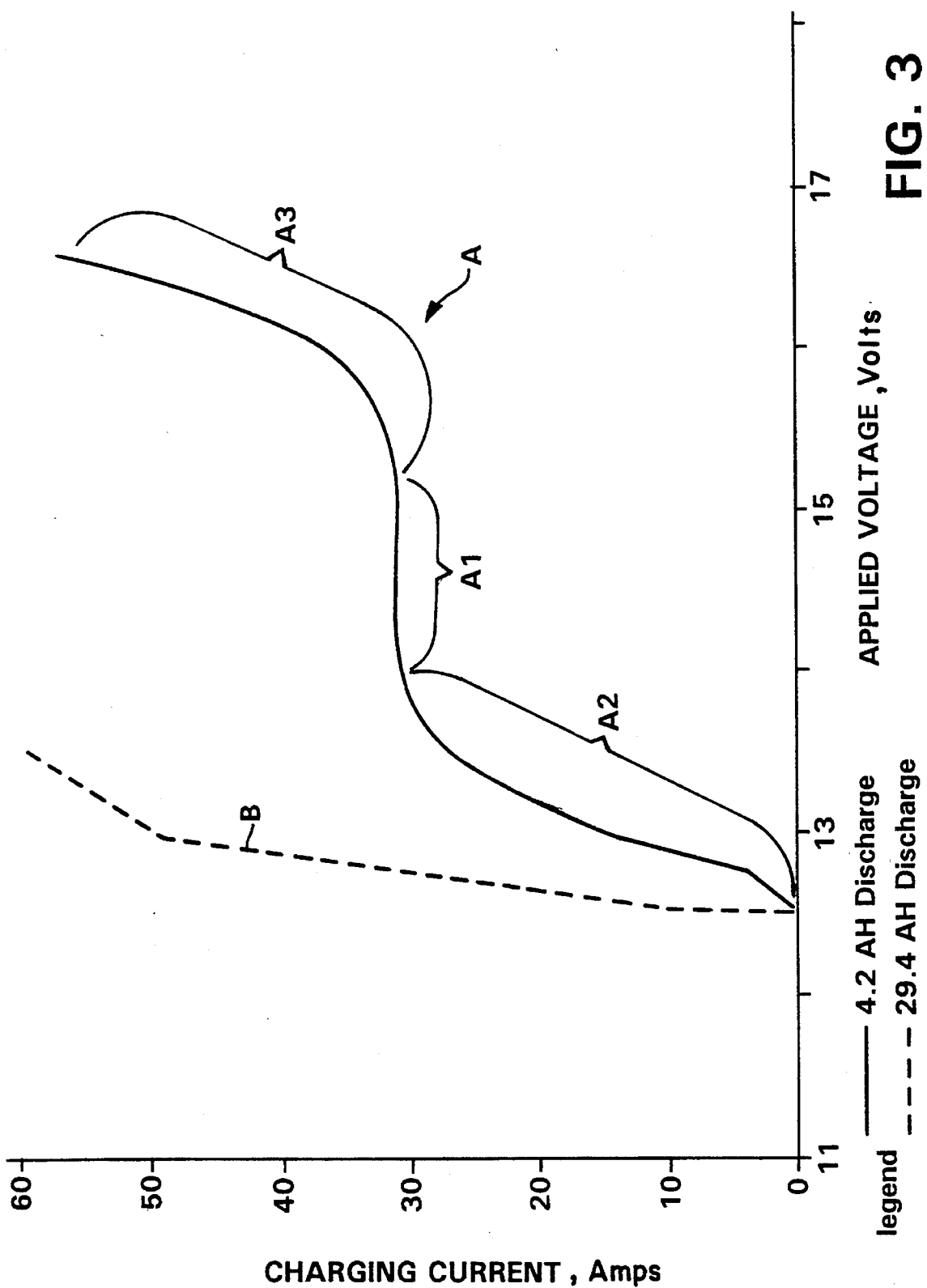
FIG. 3 is a graph of the current supplied versus the applied voltage for two batteries that were recharged after having been discharged to differing levels.

The method of charging in accordance with the present invention can be illustrated by reference to a current-voltage sweep curve. As is shown in FIG. 3, sweep Curves A and B illustrate typical sweep curves at various states of charge. These curves were generated using a sweep rate at which the voltage was increased at a rate of 0.5 volts/second (the temperature being 73° F.). The fully charged battery in Curve B had been subjected to a discharge of 29.4 Ampere Hours while the battery in Curve A was a battery that had been discharged by only 4.2 Ampere Hours.

By way of illustration, the method of the present invention involves determining the optimum charging voltage of the battery as that voltage changes as the battery is being recharged. In the state-of-charge indicated at Curve B, the battery being charged can accept a current in excess of about 60 Amps so that a battery charger (as used in this illustration) that can only provide about 58 Amps or so can be set at the applied voltage (greater than 13.5 volts) that will yield its maximum current (i.e., 58 Amps) at this stage. However, as that battery becomes more fully charged, illustrated by Curve A, the sweep current for optimum charging efficiency drops well below 58 Amps. Thus, to achieve optimum charging performance, a charging voltage applied should be in the flat portion of the Curve A, namely A1 (14 to 15 volts). While the charging voltage used could, of course, be less than the level determined in the area A1, of Curve A, this would involve utilizing less than optimum charging since such lower voltage would be associated with the first upward portion of Curve A, namely A2. On the other hand, utilizing voltages well above that in the flat portion of Curve A will result in excessive gassing. Thus, use of voltages associated with the second upward part of Curve A, namely A3, would result in undue gassing and, accordingly, less than optimum charging performance.

However, as may be appreciated, one aspect of the significant benefits derived from the present invention is the versatility. The current-voltage information may thus be utilized in whatever fashion desired to control the charging sequence to achieve whatever objectives have been established.

What is important is that the current-voltage information provides a clear picture of the condition of the battery being charged at that time so that those established objectives can be met with that clear picture in hand. Thus, for example, it may be desirable for many applications to control the charging sequence by determining the inflection point of the curve, as occurs when the slope S equals $S_{min}$ as shown at 66. If this is all that is desired, then the step at 74 may be eliminated, either actually or effectively (the latter occurring by setting k3 at a relatively high negative value). When k3 is set at zero or a low positive value, the applied charge voltage might be somewhat displaced from the inflection point of the curve but will still be within the flat portion of the curve (e.g., A1 of Curve A).

On the other hand, if some gassing is desired for whatever reason or if enhanced temperature sensitivity is desired, k3 can be set at a higher value that will correspond to a higher gassing condition, e.g., somewhere on the upper portion of A1 or on A3 of Curve A in FIG. 3. Thus, when the latter objective is important, it has been found desirable in accordance with the present invention to utilize the overcharge or gassing portion of the curve since this portion of the current-voltage sweep curve has been found to be much more sensitive to temperature changes than the other portions of the sweep curve, especially when the battery approaches a full state-of-charge condition. Yet, this temperature sensitivity can be achieved while also using an applied voltage for charging that does not result in undue gassing. This condition can thus be achieved by setting the charger voltage, $V_C$, in step 80 not as $V_{min}$, but at a voltage level sufficiently below $V_{min}$ so as to be in the region where undue gassing does not occur. For example, the charger voltage, $V_C$, may be set at a value between $V_{min}$ and the voltage at the inflection point of the sweep curve (e.g., portion A1 of Curve A).

As has been described herein, the method of the present invention achieves many and significant benefits in charging lead-acid batteries. The truly interactive nature of this charging method and apparatus inherently compensates for temperature, service life history and the array of other factors that can alter the charging regime, including batteries that are in a partially malfunctioning state. The present invention is applicable to any type of a lead-acid battery and suitably alters the charging regime to fit the type of battery being charged. Yet, the method and apparatus used are straightforward and may be readily applied using available chargers and other available equipment.

Perhaps a particularly useful application will involve controlling the charging apparatus in automobiles and the like. This should minimize, if not wholly obviate, any problems due to frequently undercharging so long as adequate charging capacity is available, as are becoming a concern to the automobile industry, as well as obviating undue gassing as is also an important concern.

Determining the desired charging voltage by using the slope or change in slope of the current-voltage curve (or dI/dt where a constant voltage sweep rate is used) is a facile technique. However, any other technique desired can be employed to determine the charging voltage considered appropriate for the objectives wanted.

Indeed, if desired, more sophisticated methods for determining the characteristics of the current-voltage curve can be utilized. For example, electrical circuitry which directly measures values proportional to slope can be used.

Also, while a two-point regression analysis of slope has been illustrated, it should be appreciated that a three-point analysis (or even more) could be used. This could be accomplished by storing the current and time of a data point immediately prior to the other two data points used in the illustrative embodiments. Sequentially, the three point regression would involve as a first point ($I_{01}$ at voltage $V_{01}$), a second point ($I_0$ at voltage $V_0$) and a third point (I at voltage V). The slope S then becomes $$(I-2I_0+I_{01})/(V-2V_0+V_{01}).$$

Still further, pursuant to another and preferred aspect of this invention, the point at which the charging sequence is completed and can be terminated, if desired, can be determined from the voltage data being developed as the charging regime proceeds. Thus, when the battery has reached its full state of charge, the applied voltage becomes constant over a period of time. This condition can be used as the signal to terminate charging, to provide an acid-mixing step in those batteries where acid stratification so requires, or to adjust the current to that needed to provide a trickle charge, or whatever else may be desired.

To this end, and referring to FIG. 2A, when the initial sweep cycle is started, a value for VC0, V10 and for N are set as indicated at 31. (VC0 is a variable to store a previously generated average voltage value. V10 is an accumulator for a new average voltage value and, as indicated here, N is the number of sweep cycles.) As shown, VC0, V10 and N are set at zero as a starting point to insure, as will become apparent, that the charging regime is not prematurely terminated.

Figure 2B:
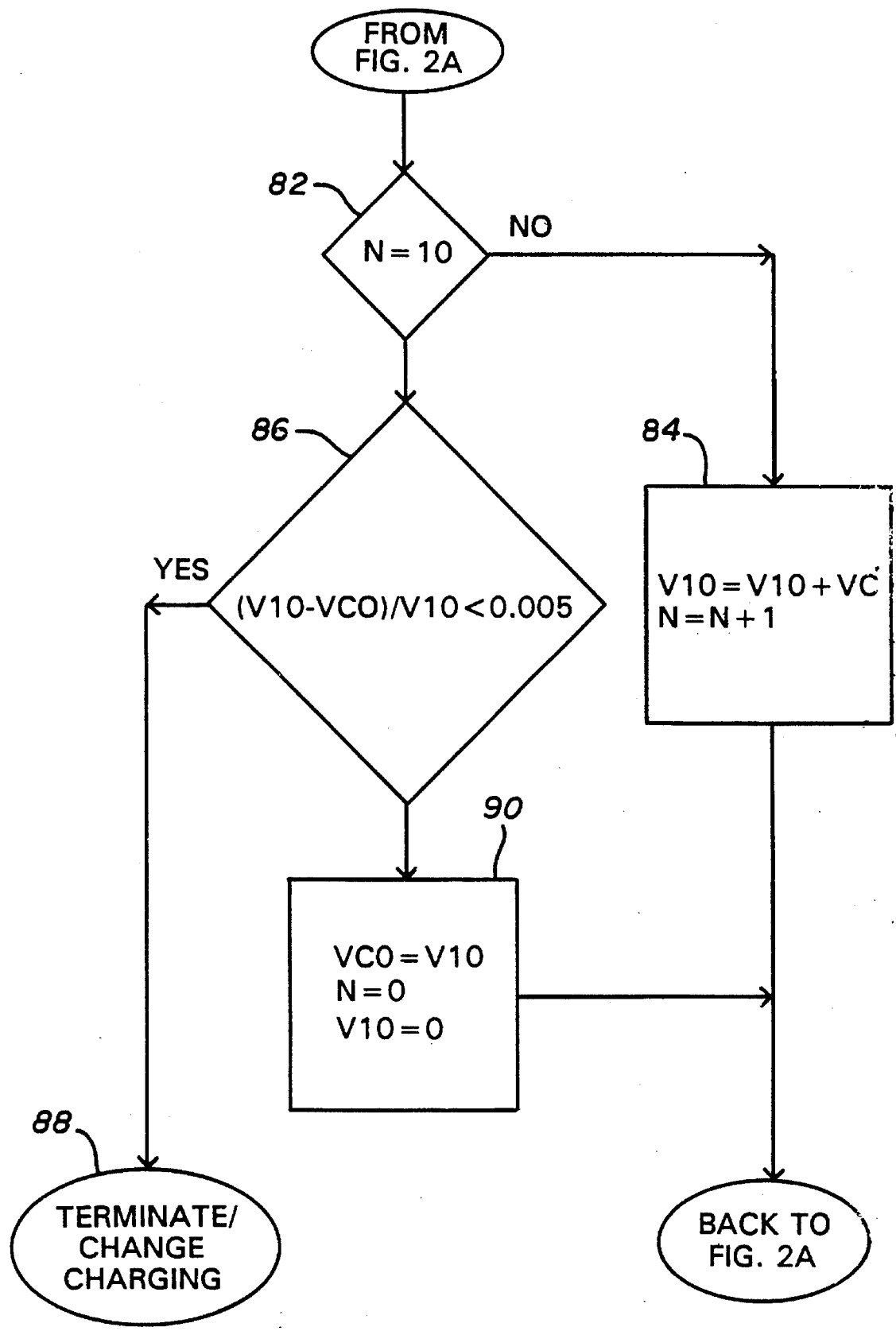

After the value for $V_C$ for the charger has been set equal to $V_{min}$ as shown at 80 in FIG. 2A (or some value lower than $V_{min}$ as the case may be), a determination is made as shown at 82 in FIG. 2B as to whether N=10. If N does not equal 10, V10 is augmented by $V_C$ and N is reset as being equal to N+1 as shown at 84; and the procedure is delayed until the next sweep.

The selection of 10 as the number of sweep cycles to determine whether charging should be continued is somewhat arbitrary. The number of sweep cycles should be such to ensure that the end-of-charge conditions have actually been met, and 10 cycles is certainly adequate for that purpose. The number of cycles used to determine whether the end-of-charge condition has been reached could be somewhat less and, of course, could be well in excess of 10 should that be desired.

If the number of sweep cycles has reached 10, then a determination is made as to whether the end-of-charge conditions have been reached. The criterion is that set at 86. More specifically, if the ratio of the difference between the accumulated charger voltage V10 in the current sweep cycle and VCO (the previous accumulated voltage value when N was zero) to V10 is less than 0.005, the charging is terminated as indicated at 88.

As may be appreciated, charging cannot be terminated in the illustrative embodiment until at least 20 sweep cycles have been carried out. More specifically, since VCO was set at 0 at the start, the criteria set forth at 86 cannot be met after the first 10 cycles, i.e., the ratio of (V10–VCO)/V10 will be 1.

The criterion set at 86 is somewhat arbitrary. The criterion should be substantially less than 1, but should be a positive value to accurately signal the end-of-charge condition by allowing for some variance in the voltage.

In the event that the voltage criterion is not met and charging is not terminated, the step at 31 is adjusted when the next sweep cycle begins after the delay indicated at 62. If the criterion set is not met, VCO is set at the accumulated charging voltage and V10 and N are reset at zero as shown at 90. These values are stored until the initiation of the next cycle and then the procedure is repeated until the end-of-charge condition is detected.

The following Examples are exemplary of the present invention, but not in limitation thereof. Unless otherwise indicated, the state-of-charge measurements were based upon how many Ampere Hours were required to completely discharge the battery (complete discharge being defined as the battery having a discharge voltage of 10.5 volts). Thus, for example, if 100 Ampere Hours had been determined to completely discharge a particular battery, a discharge of 10 Ampere Hours would mean that the state of charge would be 90%. Also, unless otherwise indicated, the voltage sweeps described were carried out by continuously increasing the voltage as opposed to incremented increases. Further, as used in these Examples, the terminology "sweep charge limiting current" refers to the current associated with the flat portion of the sweep curve (e.g., A1 in FIG. 3).

EXAMPLE 1

This Example illustrates how the sweep curves generated vary as the battery approaches a full state-of-charge.

Figure 4:
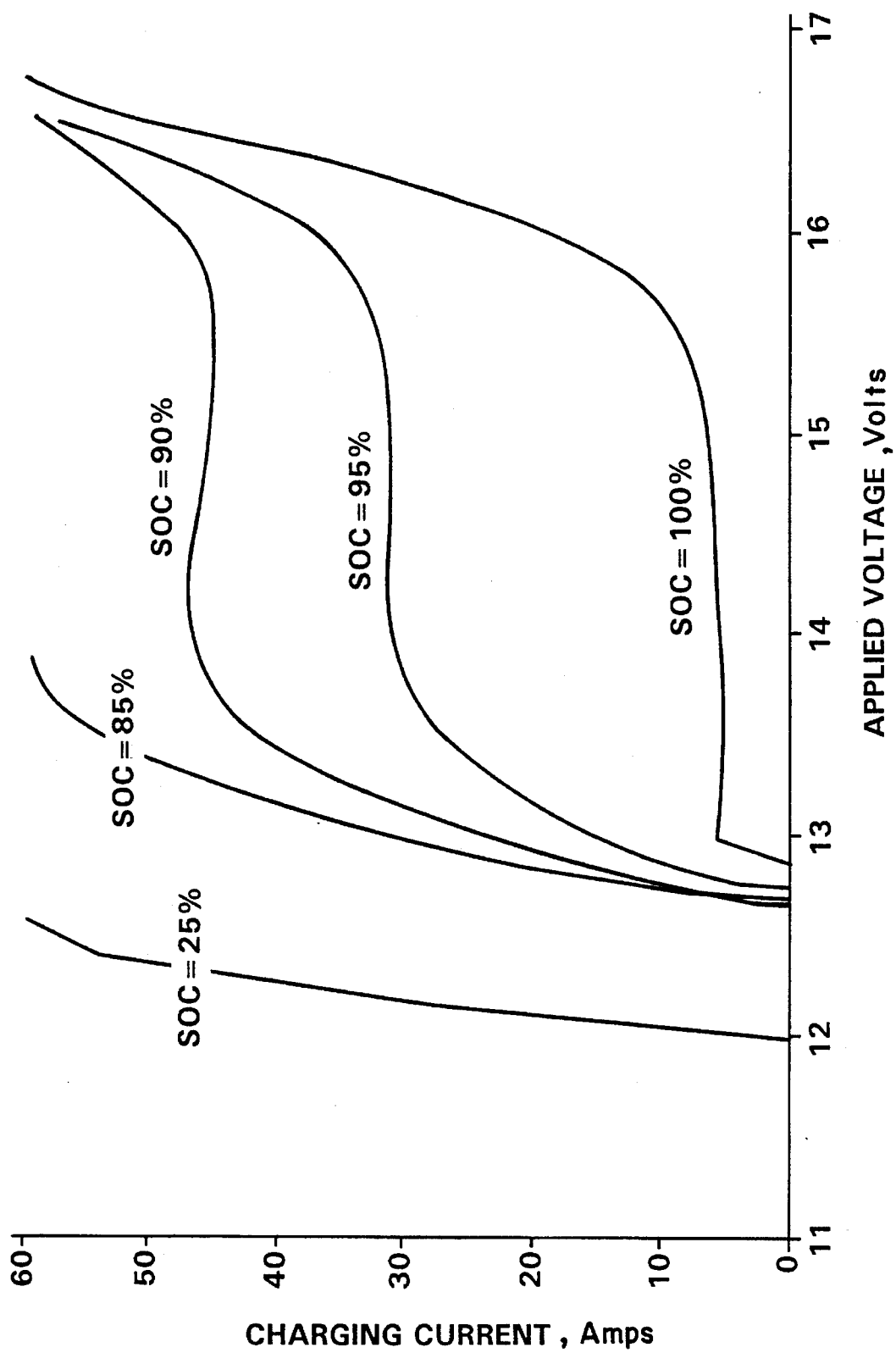
FIG. 4 is a graph similar to FIG. 3 except showing the results of voltage sweeps as the lead-acid battery is being recharged and the state-of-charge increases from 25 to 100%.

Commercial Group 65 lead-acid batteries were used. These batteries were fully charged and were then discharged to various states at a rate of 4 Amps. Thereafter, a voltage sweep from 12.5 Volts to 16.5 Volts was applied at a sweep rate of 0.5 volts/second. The temperature of the batteries was about 73.5° F. FIG. 4 shows the current-voltage sweep curves. The charger utilized provided a maximum current of about 58 Amps. As can be seen from FIG. 4, the sweep charge limiting current decreased to about 32 Amps or so as the state-of-charge increased from an 85% state-of-charge to a 95% state-of-charge.

Figure 5:
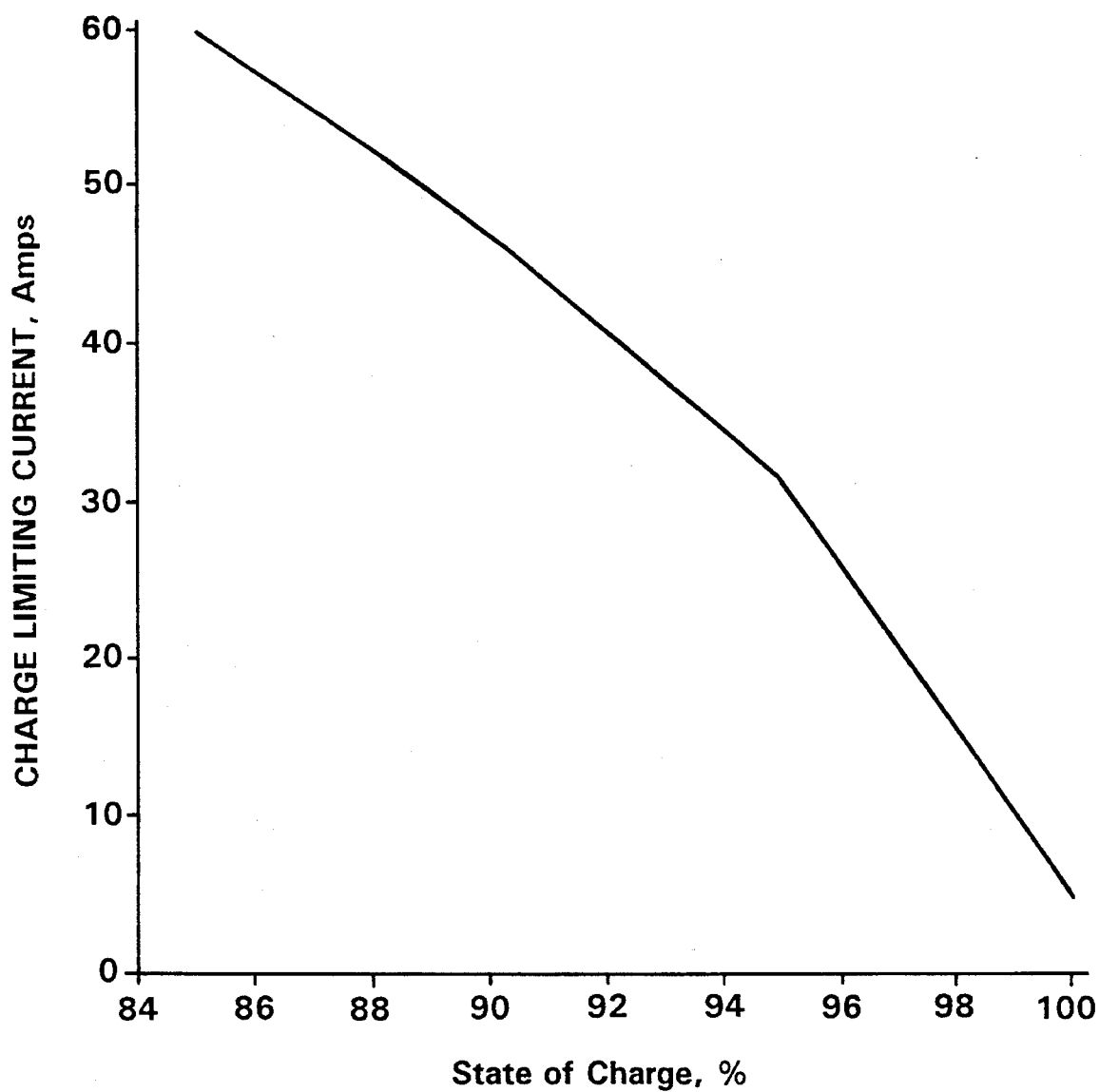
FIG. 5 is a graph of the sweep charge limiting current versus the state-of-charge and illustrating the relationship as the state-of-charge is increased to 100%.
Figure 6:
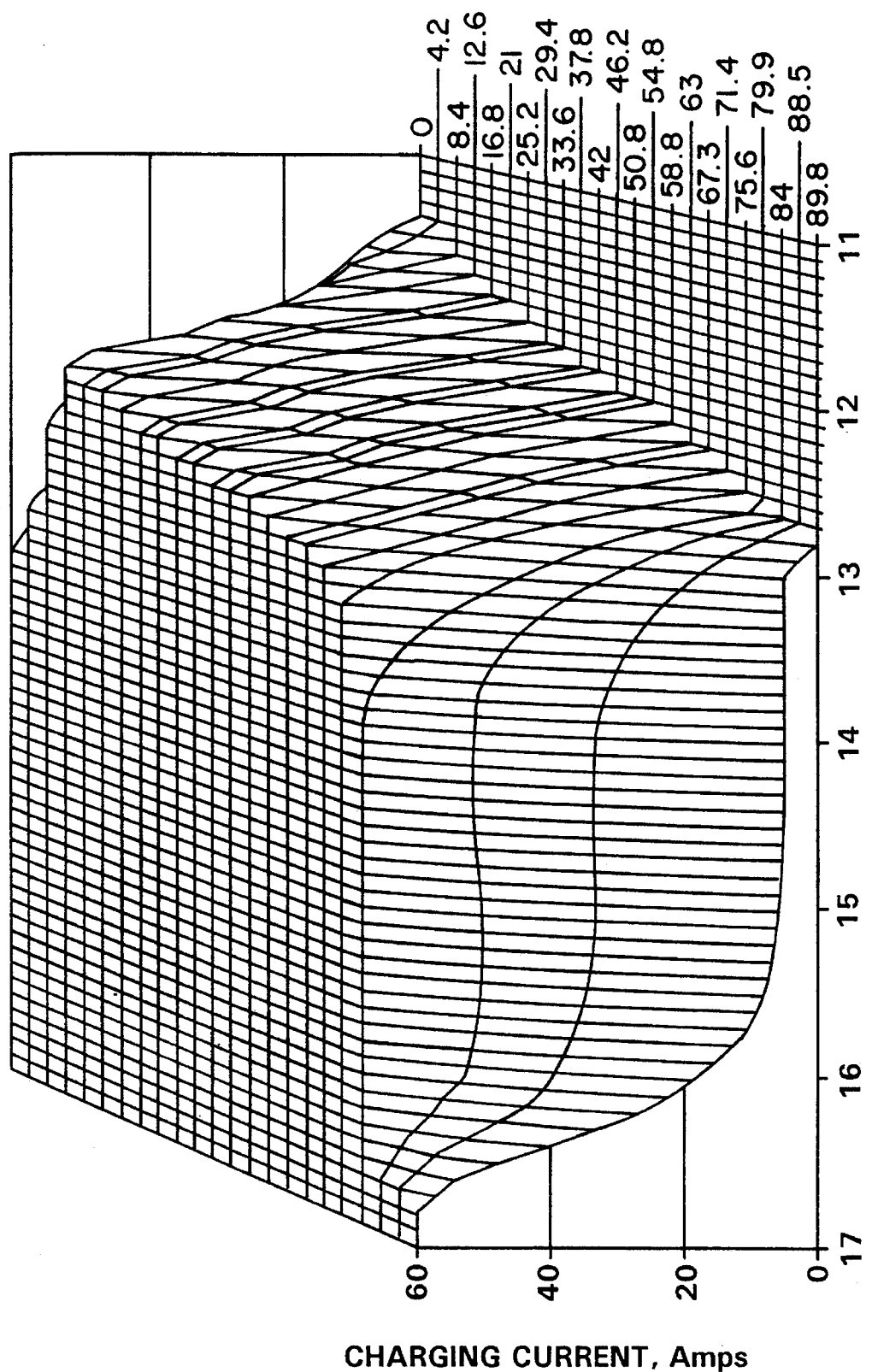
FIG. 6 is a graph of the charging current versus the applied voltage similar to FIG. 4 except showing the voltage at relative states of charge.

FIG. 5 shows the appropriate sweep charge limiting current for the specific batteries tested as the state-of-charge increases to 100%. FIG. 6 is a three-dimensional plot showing the relationship between the state-of-charge (Ampere Hours) versus applied voltage and sweep current.

Figure 7:
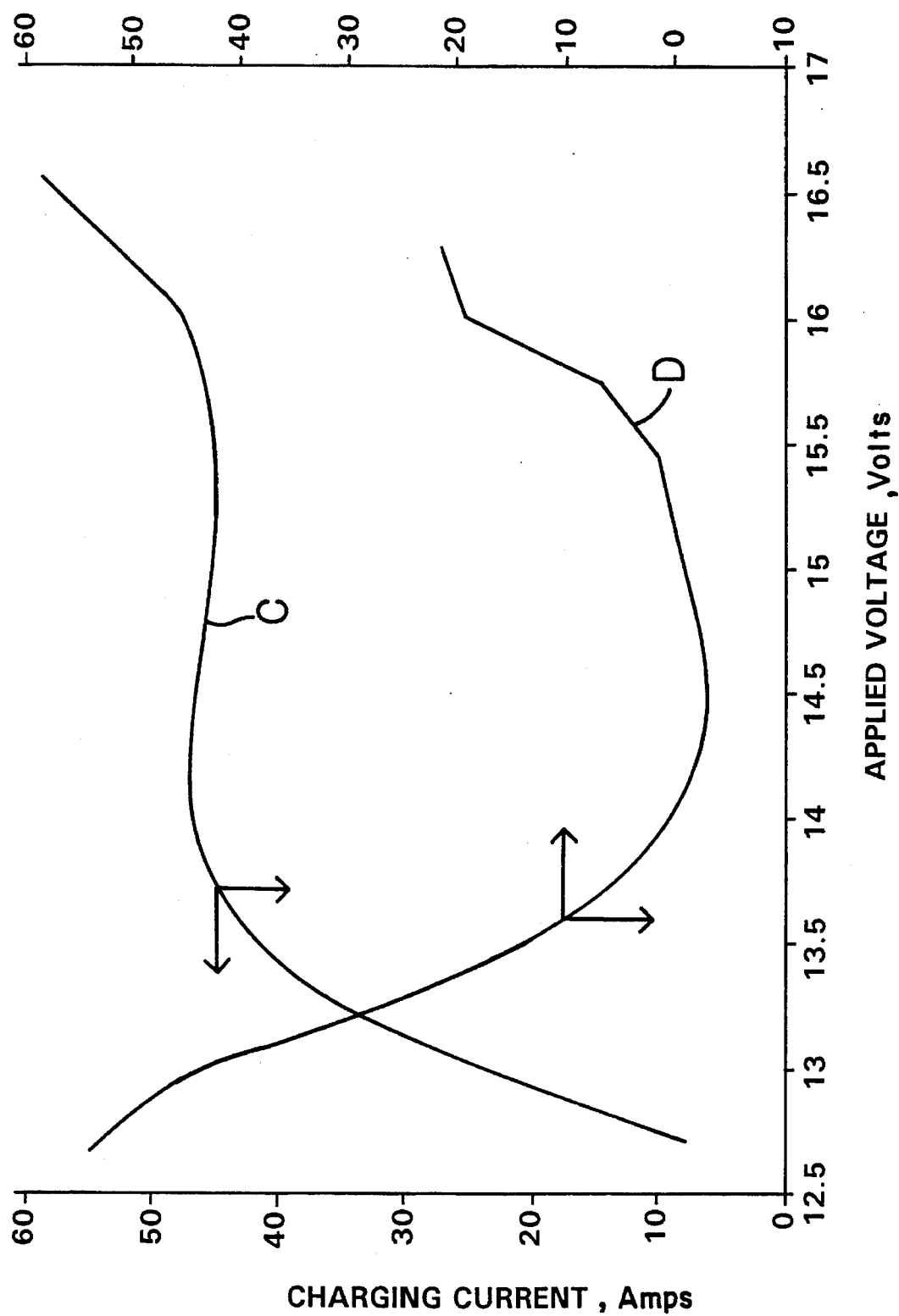
FIG. 7 is a graph similar to FIG. 4 except also showing how the slope of the current-voltage curve changes during the voltage sweep.

FIG. 7 shows the voltage sweep curve (indicated as Curve C) when the state-of-charge of the battery was at 90%. Curve D is a plot of the slope of that curve (dI/dV) and shows how the slope minimum corresponds with the inflection point of Curve C where the sweep charge limiting current occurs.

EXAMPLE 2

This Example shows the use of the present invention at various temperatures and at various sweep rates.

Figure 8:
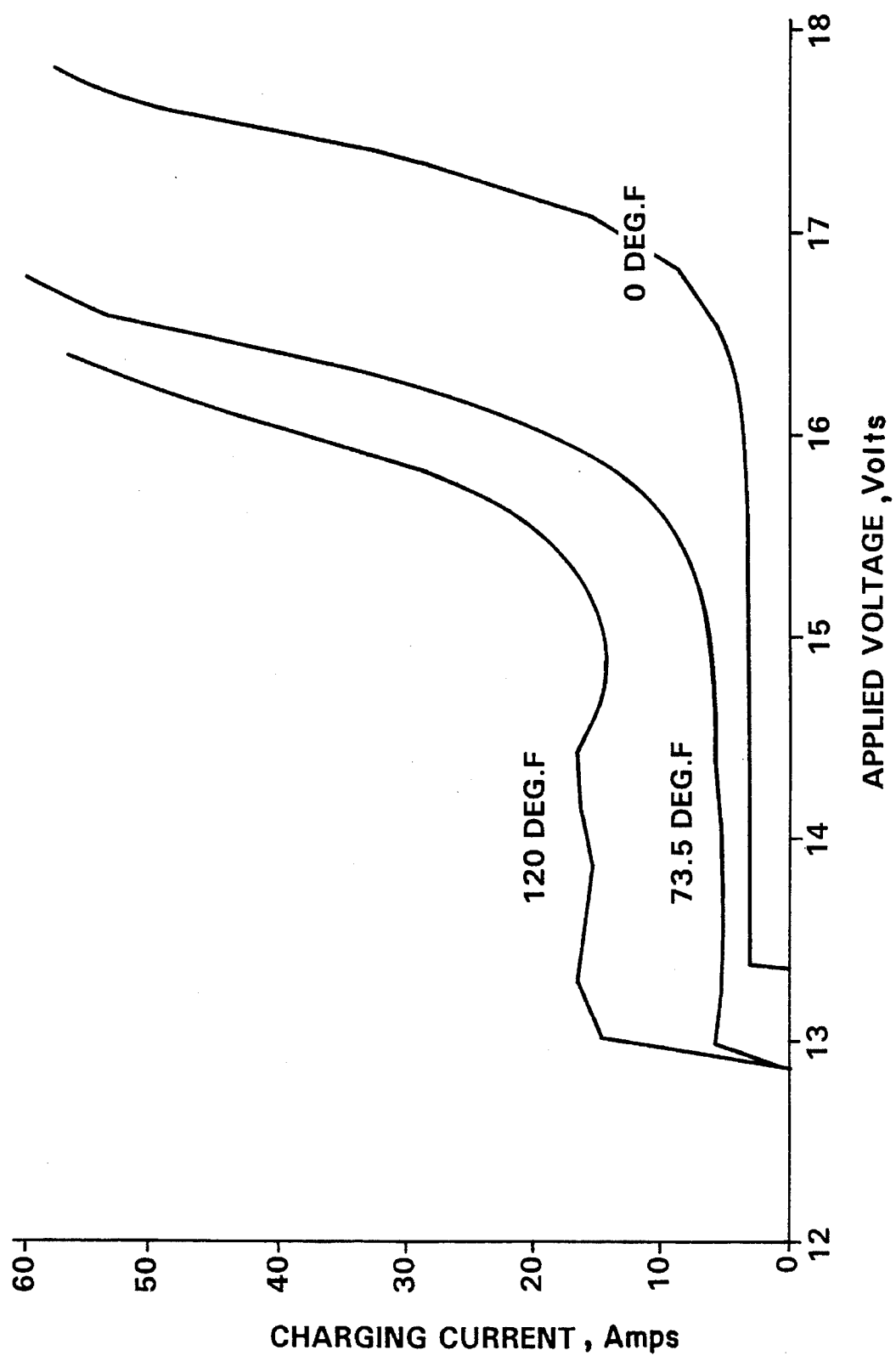
FIG. 8 is a graph similar to FIG. 4 and showing the voltage sweep information when the temperature of the battery is varied.
Figure 9:
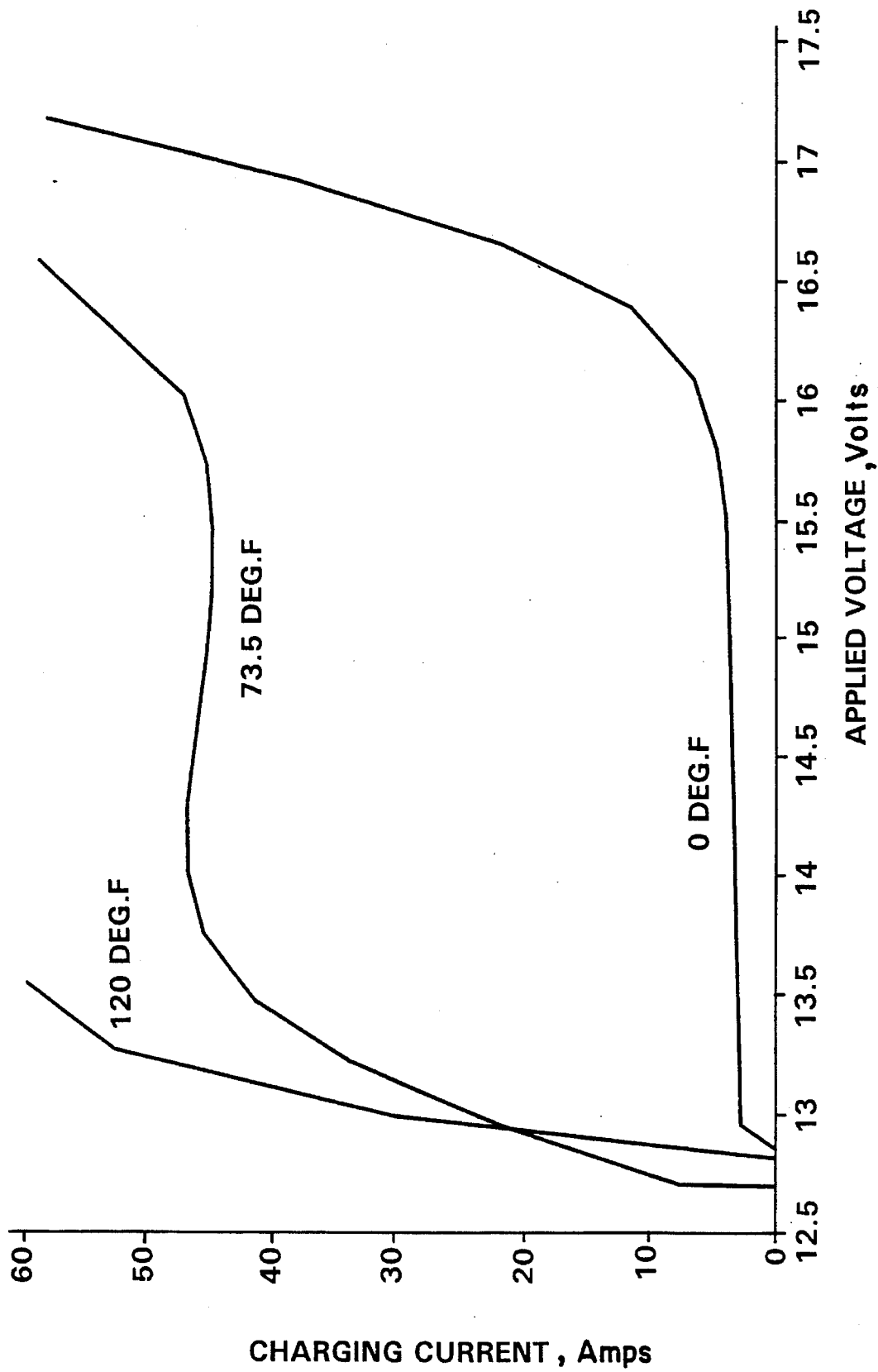
FIG. 9 is a graph similar to FIG. 7 except showing the voltage sweep information obtained at a different state-of-charge.

Commercially available Group 65 lead-acid batteries were fully charged, and some were then discharged to a 90% state of discharge at a rate of 4 Amps. The batteries were maintained at a temperature of either 0° F., 73.5° F., or 120° F., and voltage sweeps were carried out at a rate of 0.5 volts/second. The results are shown in FIGS. 8 (100% state-of-charge) and 9 (90% state-of-charge).

As can be seen, the various temperatures at which the batteries were maintained did change the position of the voltage sweep curve. However, the fundamental characteristics of the sweep curves did not change. Thus, the sweep curves used in this invention can be utilized to appropriately adjust the battery charging conditions whatever the temperature.

Figure 10:
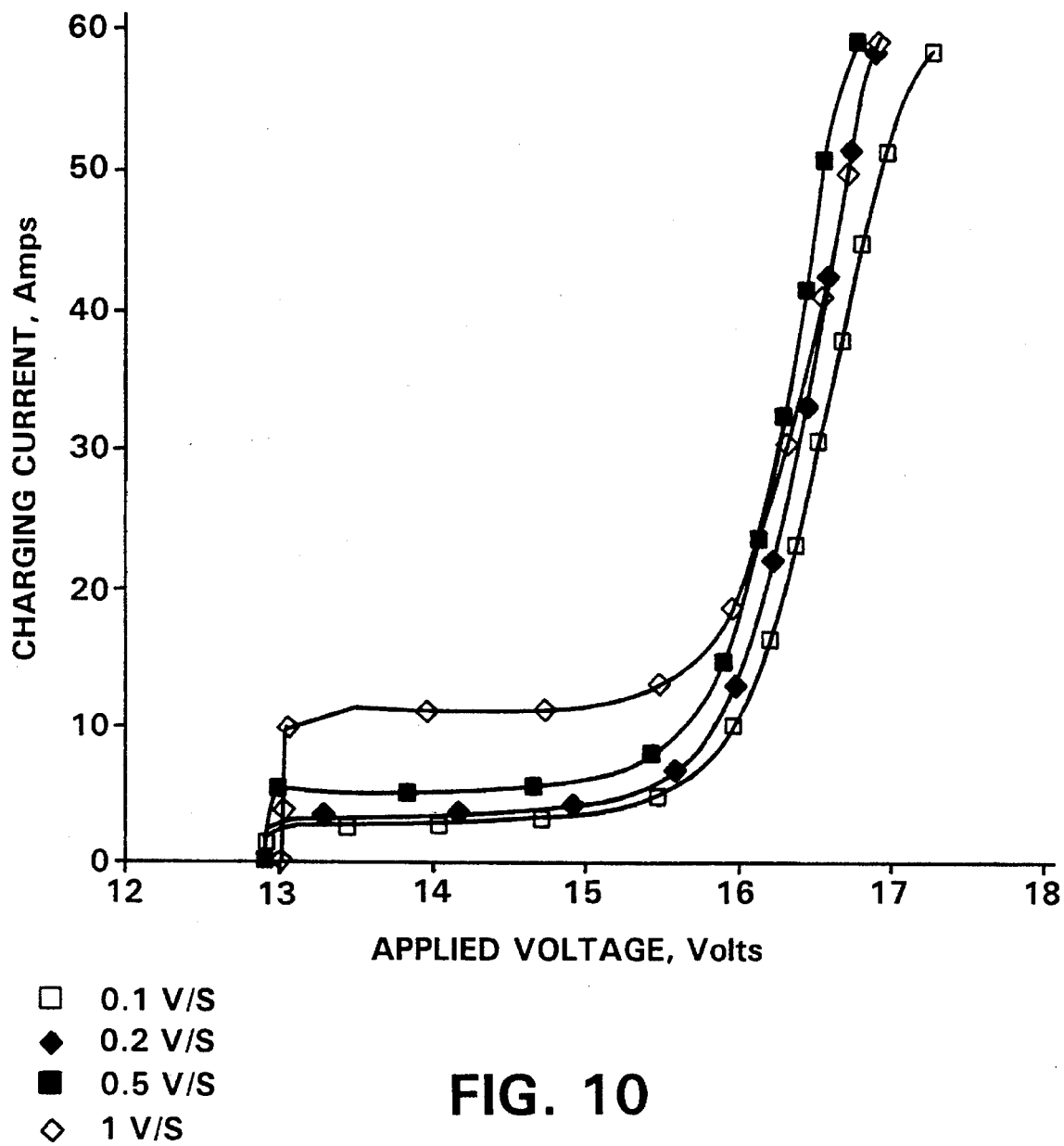
FIG. 10 is a graph similar to FIG. 4 except showing voltage sweep information determined at varying sweeping rates.

A series of the commercially available Group 65 lead-acid batteries were also subjected to various sweep rates. These batteries, maintained at a temperature of 73.5° F., and a state-of-charge of 100% were subjected to sweep rates of 0.1, 0.2, 0.5 and 1 Volt/Second. The results are shown in FIG. 10. As can be seen, the characteristic curves are developed at all sweep rates. The sweep charge limiting currents vary with the sweep rate used, but the optimum charging voltage remains essentially the same.

EXAMPLE 3

This Example shows that the use of sweep curves to assist in determining when battery charging, for example, can be terminated.

Figure 11:
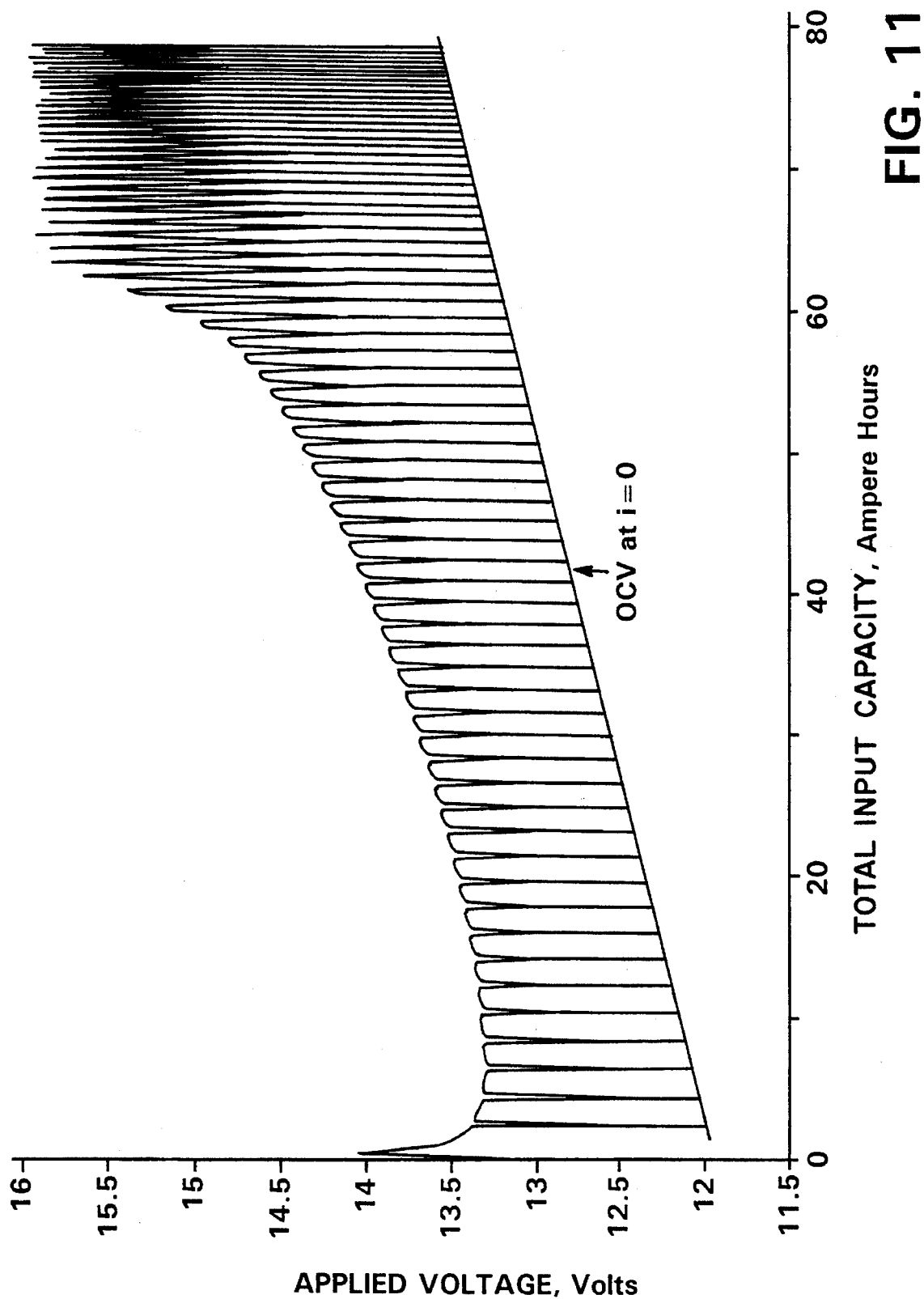
FIG. 11 is a graph similar to FIG. 4 except showing the results of a sweep-up and back and the linear change of the open circuit voltage as the state-of-charge is increased.

A commercially available Group 65 lead-acid battery was fully discharged to 10.5 Volts at a rate of 4 Amps. The first half of each cycle involved a sweep rate at a constant rate of 0.05 volts/second for about 42 seconds; the other half of the cycle involved a sweep back at a constant rate of 0.05 volts/second for about 42 seconds. The results are shown in FIG. 11. As can be seen, the voltage at zero current varied linearly using the cycling regime described herein.

Figure 12:
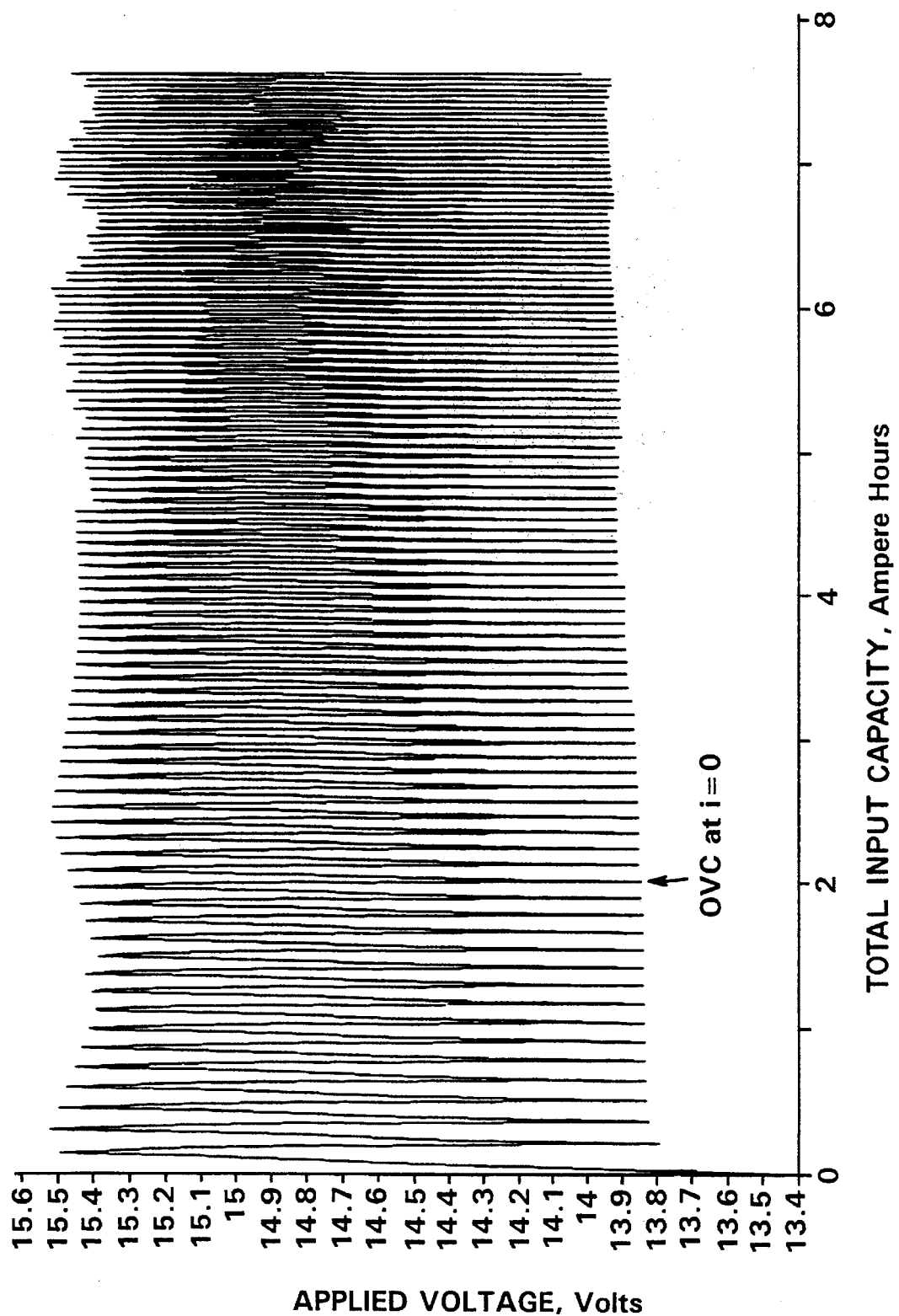
FIG. 12 is a graph similar to FIG. 11 except showing voltage sweeps, up and back, after the battery has reached full charge.

After the batteries have been fully charged, additional current (calculated as Ampere Hours) was supplied to the battery for a period of time. FIG. 12 shows the results. As can be seen, the voltage at which the applied voltage resulted in zero current being provided to the battery stabilized at about 13.8 to 13.9 volts.

Accordingly, based upon this data, the voltage sweep data can be employed to provide an indication of the battery state-of-charge for a given type of battery. Based upon the information in this Example, the equation for the state-of-charge (determined as Ampere Hours) is as follows:

$$\text{Ampere Hours} = 47.62 \times (OCV - 11.92).$$

Further, this Example demonstrates that the voltage data can be used to indicate the end-of-charge condition.

EXAMPLE 4

This Example illustrates that the charging method of the present invention inherently compensates for temperature.

A fully charged, commercially available Group 58 lead-acid battery was used. The battery was first cooled down to temperatures well below ambient and then warmed as a function of charging time. A thermocouple was placed in one cell of the battery in contact with the electrolyte to determine the temperature of the battery. Thereafter, the battery was further charged in accordance with the present invention, utilizing an incremental sweep rate of 0.2 volts/second and a sweep frequency of 1/minute. Some data points were also developed by heating the battery to temperatures well above ambient and then determining the charging voltage by the procedure described herein.

Figure 13:
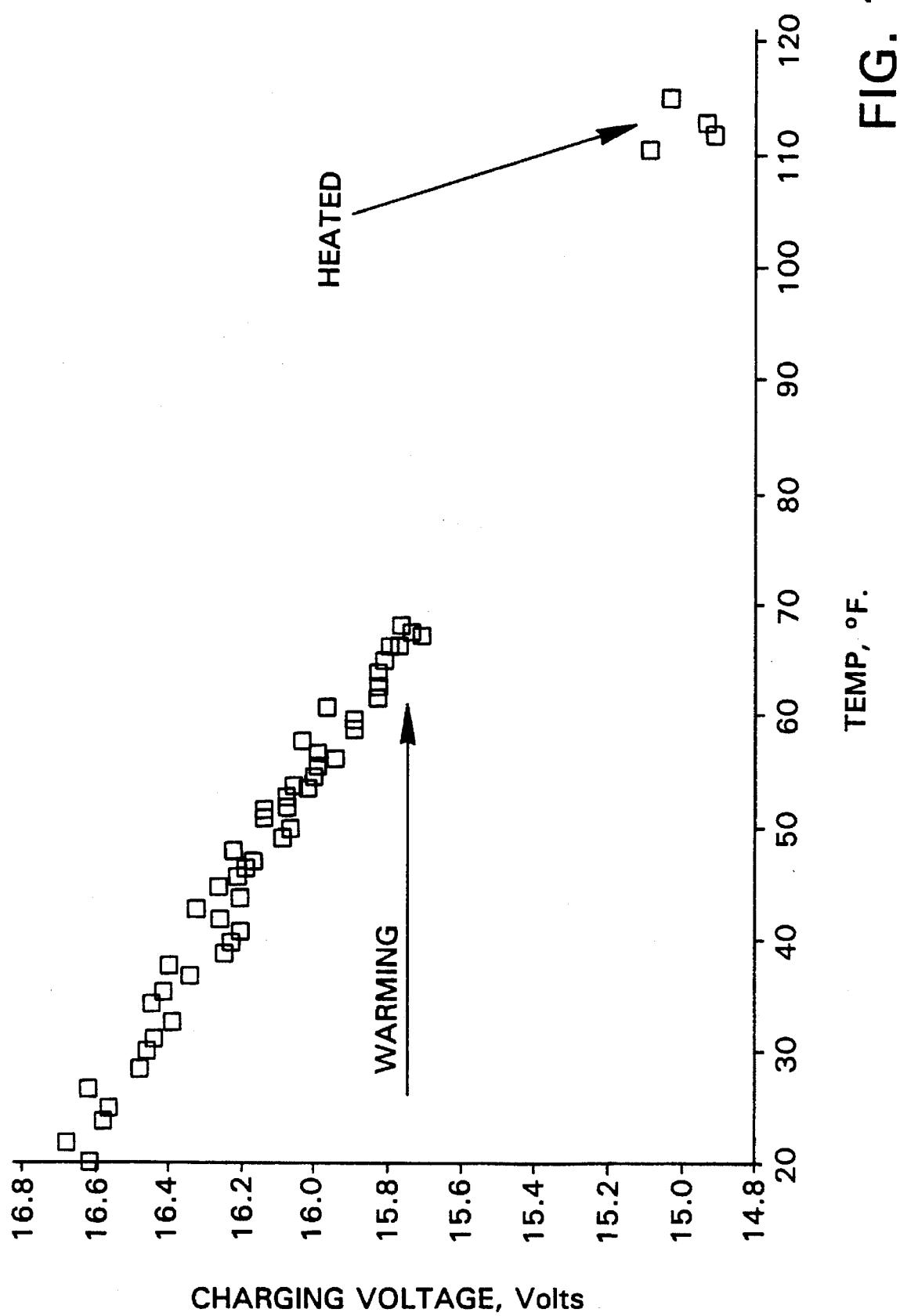
FIG. 13 is a graph of voltage versus temperature and showing a temperature compensation effect resulting from utilizing the method and apparatus of the present invention.

FIG. 13 is a graph of the charging voltage versus the battery temperature. The temperature measured was for reference only and was not used to set the charging voltage. The charging voltage selected was determined solely by the sweep technique of the present invention using a value of 1 volt below a slope of 0.8 Amps/second after a minimum slope was detected (i.e., k3 at 74 in FIG. 2A was 0.8 Amps/second and $V_C$ at 80 was set equal to: $V_{min}-1$). As can be seen, the charging voltage determined in accordance with the present invention varies with temperature in essentially a linear or direct manner.

Based upon this data, the use of the present invention can compensate for the temperature of the battery as the charging technique proceeds. This Example also specifically demonstrates the temperature sensitivity of the gassing or overcharge part of the sweep curve.

EXAMPLE 5

This Example shows the use of the present invention in connection with lead-acid batteries of widely varying types as well as a partially malfunctioning battery.

One set of experiments compared a commercially available Group 34/78 battery with a similar battery that had one cell that was inoperative due to a short. These two batteries, maintained at about 80° F., were charged using the voltage sweep technique of the present invention, and the applied voltage and current were determined as the charging continued. More specifically, these batteries were float-charged. The incremental voltage sweep rate used was 0.2 volts/second, and a sweep was carried out every minute. A slope of 0.05 Amps/second criterion was used after a minimum slope value was detected.

Figure 14:
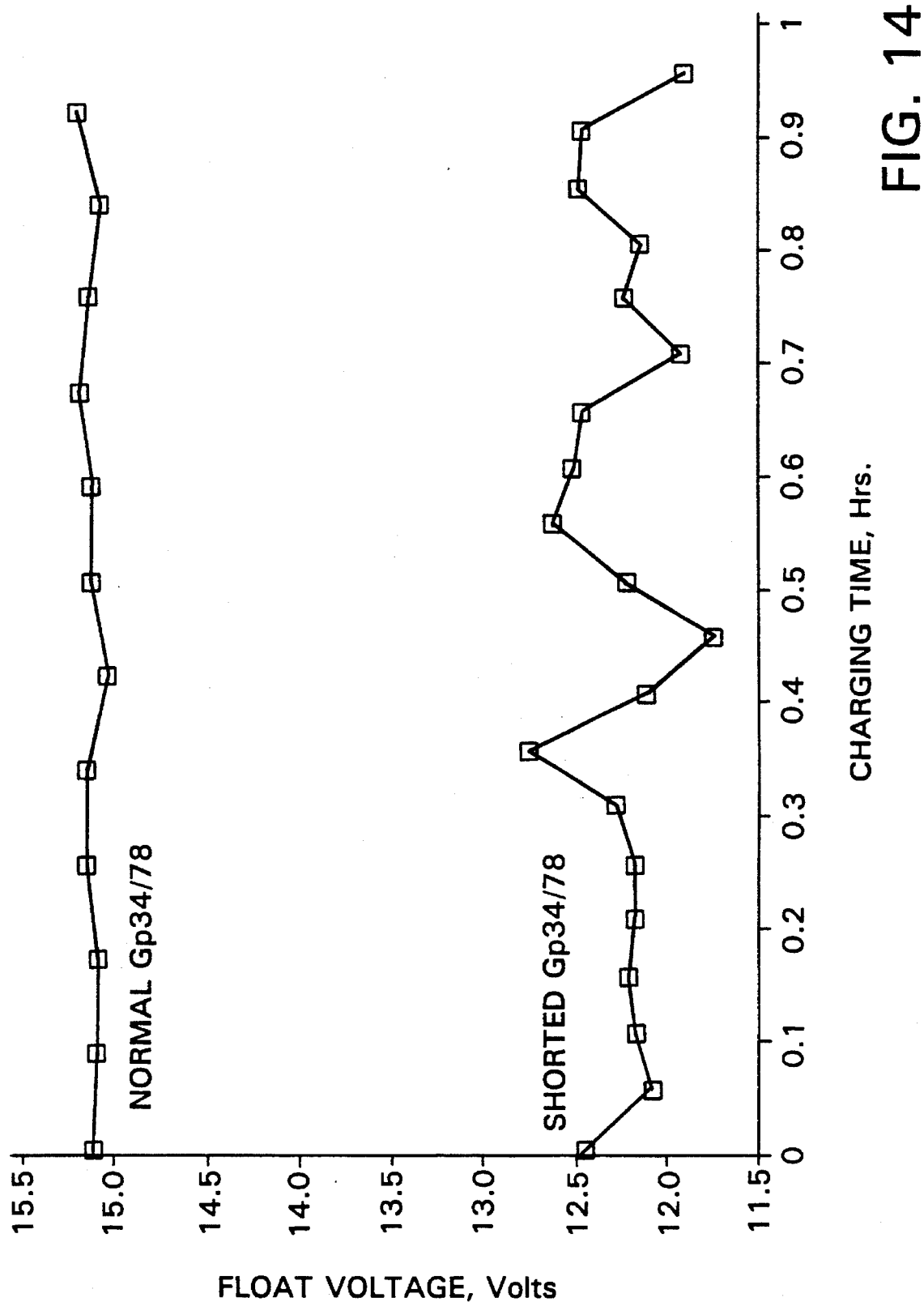
FIG. 14 is a graph of charging time versus applied voltage and illustrating that the use of the present invention inherently compensates when charging a partially defective battery compared to a normal maintenance-free battery.

The results are shown in FIG. 14. As can be seen, the interactive nature of the present invention inherently compensated for the partially shorted battery, lowering the charging voltage. No excessive heat or gas were observed, as would be expected if a fixed voltage-controlled charger had been employed.

The other set of experiments involved charging with the method of this invention, using the parameters described in this Example, a commercially available, sealed marine recombinant lead-acid battery having a rated capacity of about 78 Ampere Hours and a commercially available Group 34/78 lead-acid battery having a rated capacity of about 70 Ampere Hours, the rated capacities being at a 20-hour rate. The results of the charging regime are shown in FIG. 15.

Figure 15:
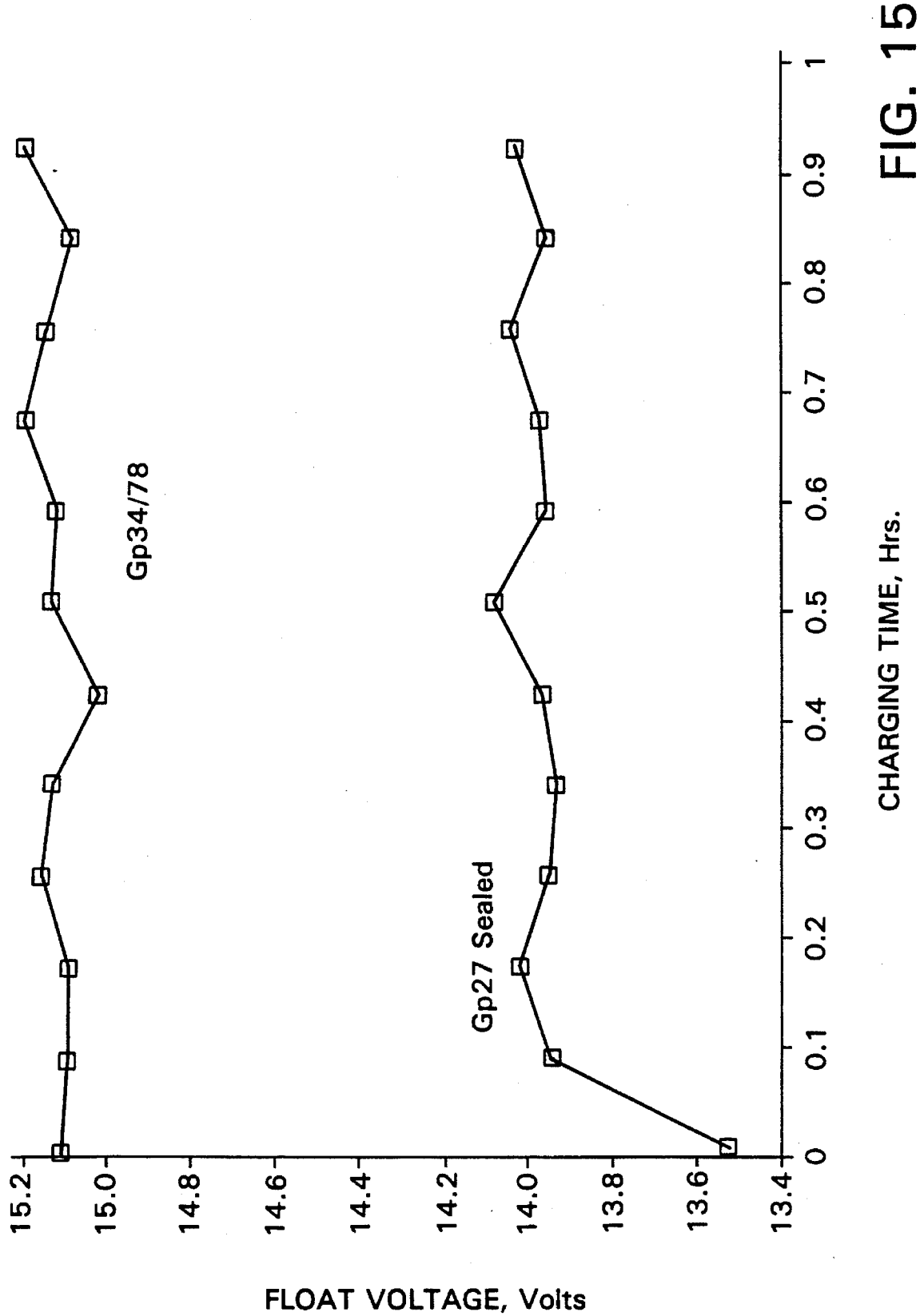
FIG. 15 is a graph similar to FIG. 14 except showing how the use of the present invention can be utilized with a sealed recombinant lead-acid battery versus a standard maintenance-free battery.

As can be seen by comparing FIGS. 14–15, the use of the present invention inherently alters the charging regime as dictated by the type and condition of the battery.

EXAMPLE 6

This Example demonstrates the inherent compensation for the internal resistance of a battery by using the charging sequence of the present invention.

A commercially available Group 34/78 battery nominally rated at 70 Amp Hours was discharged for about 20 Ampere Hours. Then, the battery was recharged using the technique described herein with a power supply having a 6.4 Amp maximum current output. The incremented sweep rate used was 0.2 volts/second, and k3 was set at zero. During each of 10 minute charging periods, a series of wires with various measured resistances were placed between the charging apparatus and the battery.

Figure 16:
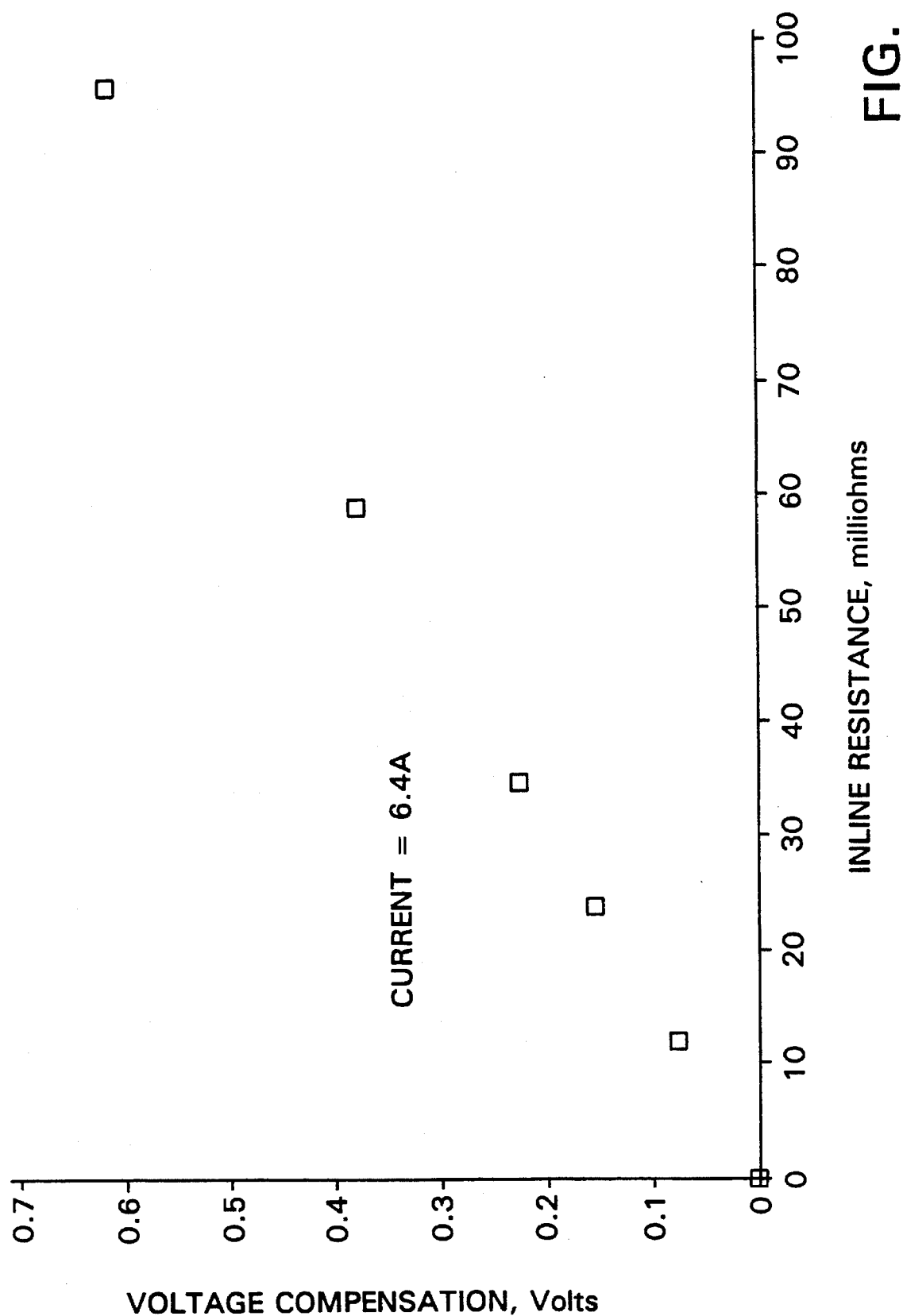
FIG. 16 is a graph showing the inherent resistance compensation effect of the present invention in charging of a standard maintenance-free lead-acid battery.

As shown in FIG. 16, the resulting charging profiles demonstrate that the voltage of the charger increased proportionally to the resistance of the interconnecting wire to keep the current at a maximum value. This demonstrates that the present invention inherently compensates for resistance.

We claim:

1. A method of controlling a charging of a lead-acid battery by adjusting a charging voltage in accordance with periodic voltage sweeps which comprises detecting the voltage of the battery being charged, lowering the voltage being applied to the battery until a minimum acceptable level of current is detected, initiating a voltage sweep over a predetermined range at an augmented voltage rate with time, detecting whether a maximum current for a charger power supply has been reached, setting the charging voltage at that point if the maximum current has been reached and stopping the voltage sweep at that point, continuing the voltage sweep when the charger current has not been maximized, determining voltage and current values at intervals during the voltage sweep, selecting the charging voltage based upon the current-voltage values determined, terminating the voltage sweep, delaying for a predetermined period of time and thereafter initiating a further voltage sweep.

2. The method according to claim 1 wherein the initial sweep voltage of the battery is reduced a predetermined amount by a discharge current pulse.

3. The method of claim 1 wherein the charging voltage is selected by determining a minimum dI/dV slope.

4. The method of claim 3 wherein the minimum dI/dV slope is determined by selecting a predetermined minimum slope value, and periodically resetting said predetermined minimum slope value with slope values determined from dI/dV values as the voltage sweep proceeds until a slope value is determined that is larger than the immediately prior determined slope value.

5. The method of claim 4 wherein, after a minimum slope is determined, the charging proceeds until a certain slope value or change in slope value is encountered.

6. The method of claim 4 wherein the voltage is swept until a high slope or change in slope value occurs, thereafter setting the charging voltage at a voltage between the minimum and the high slope values.

7. The method of claim 1 wherein an end-of-charge state of the battery being charged is determined by selecting a predetermined number of voltage sweep cycles and determining the end-of-charge state when the relative or specific change of the average charging voltage is less than a predetermined value.

8. The method of claim 1 wherein the voltage is augmented at a constant rate.

9. The method according to claim 1 wherein the initialed sweep voltage of the battery is reduced a predetermined amount by a predetermined time.

* * * * *